United States Patent [19]
Thorpe

[11] Patent Number: 5,954,311
[45] Date of Patent: Sep. 21, 1999

[54] LOW POWER PILOT VALVE ACTUATED BY TRANSVERSE OR PERPENDICULAR ACTION

[75] Inventor: Gary Keith Thorpe, Townsville, Australia

[73] Assignee: Nu-Valve Pty Ltd, Newcastle, Australia

[21] Appl. No.: 08/983,103

[22] PCT Filed: Jul. 19, 1996

[86] PCT No.: PCT/AU96/00461

§ 371 Date: Apr. 1, 1998

§ 102(e) Date: Apr. 1, 1998

[87] PCT Pub. No.: WO97/04260

PCT Pub. Date: Feb. 6, 1997

[51] Int. Cl.⁶ .................................................. F16K 31/02
[52] U.S. Cl. .................................. 251/30.03; 251/30.05; 251/38
[58] Field of Search ................. 251/30.03, 30.05, 251/38, 65, 30.04, 901, 30.01; 137/596.16, 625.64

[56] References Cited

U.S. PATENT DOCUMENTS

| | | |
|---|---|---|
| 1,545,150 | 7/1925 | Lundberg . |
| 3,982,562 | 9/1976 | Pickett . |
| 4,084,617 | 4/1978 | Happe .................................. 251/901 X |
| 4,147,183 | 4/1979 | Kalsi .................................... 251/901 X |
| 4,351,362 | 9/1982 | Solie et al. . |
| 4,418,886 | 12/1983 | Holzer .................................. 251/30.05 |
| 4,951,915 | 8/1990 | Piao . |
| 4,986,308 | 1/1991 | Champseaux . |
| 5,027,857 | 7/1991 | Champseix . |
| 5,205,323 | 4/1993 | Baker . |
| 5,207,149 | 5/1993 | Weber . |
| 5,226,629 | 7/1993 | Millman et al. . |

FOREIGN PATENT DOCUMENTS

| | | |
|---|---|---|
| 20713/29 | 6/1929 | Australia . |
| 67750/90 | 12/1990 | Australia . |
| 57981/94 | 3/1994 | Australia . |
| 645013 | 10/1990 | United Kingdom . |

Primary Examiner—Kevin Lee
Attorney, Agent, or Firm—Paul & Paul

[57] ABSTRACT

A valve (1, 2) of the kind that is caused to open and close in consequence of the opening and closing of a bleed orifice (15) by a movable pilot valve element (3, 4, 5), characterised in that said element (3, 4, 5) is displaced from sealing relationship with the orifice (15) by a torque resulting from a force applied (7, 9) to the element (3, 4, 5) along a line of action which does not extend through the orifice (15). Another embodiment of the pilot valve element consists of a cylindrical magnet housed in an elastometric tire actuated by a permanent magnet of electromagnet (FIGS. 5–8). Actuators of the torque causing force include a solenoid (FIGS. 1–2), float (FIG. 3), and fluid pressure (FIG. 4).

10 Claims, 9 Drawing Sheets

LOW POWER PILOT VALVE ACTUATED BY TRANSVERSE OR PERPENDICULAR ACTION

TECHNICAL FIELD

This invention relates to fluid control valves, and in particular to improvements in the pilot stage of a hydraulically assisted fluid control valve. Such valves find applications in domestic toilet cisterns, stock water troughs and as electrically controlled shut off valves for garden water timers, for example.

BACKGROUND

Hydraulically assisted pilot operated valves are common in household appliances, such as in washing machines. These valves normally have a water inlet, a flexible sealing diaphragm and a water outlet. The flexible sealing diaphragm normally has some small apertures to permit the incoming water pressure to communicate with an upper chamber to force the valve closed. To permit the valve to open the diaphragm also has a slightly larger aperture communicating between the upper chamber and the valve discharge. This aperture is normally closed by a lightly spring loaded metallic plunger which is forced away from the aperture by means of an electromagnet to permit the valve to open.

Figure 9A:
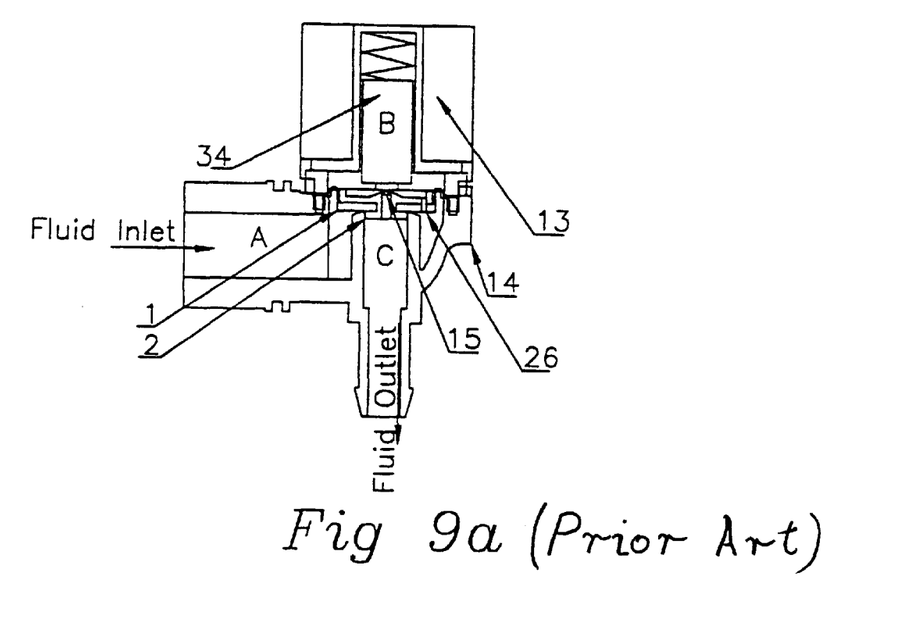
FIGS. 9a and 9b show a prior art solenoid operated valve.

Such a prior art valve is shown diagrammatically in FIG. 9a herewith. The water under pressure enters the inlet chamber marked "A" which communicates with the upper chamber marked "B" through the communicating holes 26 in the flexible sealing diaphragm 1 and its rigid diaphragm support 2. The bleed hole(or orifice) 15 to the valve discharge chamber marked "C", is normally sealed by the metallic plunger 34 which has an elastomeric sealing surface where it contacts the rigid diaphragm support 2.

As the bleed hole 15 from chamber "B" to chamber "C" is sealed the water pressure forces the diaphragm 1 and its support 2 to seal on the valve body 14 and thus prevents the flow of fluid through the valve.

Figure 9B:
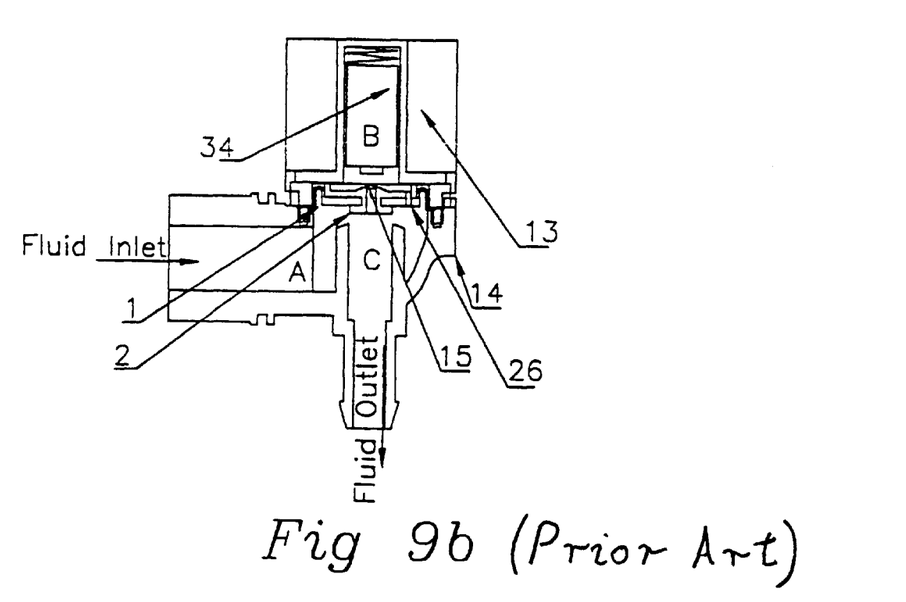

When an electric current is passed through the solenoid 13 the metallic plunger 34 is drawn away from the diaphragm 1 and its support 2 to open the bleed hole 15. Since the bleed hole 15 is normally slightly larger in area than the communicating ports 26 the pressure in chamber "B" is reduced and thus the valve may open as shown in FIG. 9b.

When the electric current is cut off from the solenoid 13 the metallic plunger 34 once again seals the bleed hole 15 and the valve closes.

With this type of valve the valve requires a continuous supply of electric current to remain open.

With this type of valve the force which must be applied to the metallic plunger 34 to open the valve is the product of the water pressure and the area of the bleed hole 15. Typically the bleed hole diameter is 1 mm so at a water pressure of 1 MPa a force of 0.8 Newtons is required to open the valve.

The high forces to unseat the metallic plunger and the requirement of a continuous supply of electric current makes unsuitable for low voltage battery operated applications, such as garden irrigation systems, which are expected to operate for many months from a small dry cell battery.

Other known valves which are also not suitable for low voltage battery operated applications are disclosed in German Patent Application No. 3927611, International Patent Application Nos. PCT/GB92/00986 and PCT/US87/00214, Australian Patent Application Nos. 18576/88 and 55204/94 and United Kingdom Patent Application No.2149148.

An object of the invention is to overcome the limitations of the above mentioned valves by providing a valve which is suitable for use in low voltage battery operated applications.

SUMMARY OF INVENTION

In a first aspect the present invention consists in a valve of the kind that comprises a valve body defining a pressure chamber which is caused to open and close by changes in fluid pressure within that chamber and wherein the pressure within the chamber is controlled by the opening and closing of a chamber bleed orifice by a movable pilot valve element within the chamber, characterised in that said pilot valve element is shifted from sealing engagement with said orifice by a moment resulting from a force applied to said pilot valve element along a line of action which does not extend through said orifice and said pilot valve element comprises a magnet or magnetisable body and wherein said force arises from a magnetic field established within said chamber.

In preferred embodiments said force is applied to the body at a point and in a direction such that the minimum distance between the line of action of the force and the orifice is at least 3 times the maximum cross-sectional dimension of the orifice.

In a second aspect the invention relates to the use of curved surfaces and lever arms to provide a mechanical advantage to enable a major reduction in the forces required to open the bleed hole in pilot operated hydraulic valves to permit the valve to open or close. The curved sealing surface may be in the form of a ribbon wrapped around a curved rocker actuated by a lever or a hollow cylindrical tire wrapped around a disk operating magnet actuated under the force of another actuating magnet.

With the major reduction in forces it becomes possible to construct valves which use electromagnetic actuators which are capable of operating from a 1.5 volt dry cell battery for extended periods of time as the valve may be latched open or closed when the current to the electromagnet is turned off.

The major reduction in forces enables the use of other actuators such as very small floats or pressure sensors to switch the valve to the open or close state.

BRIEF DESCRIPTION OF THE DRAWINGS

FIGS. 5a through 5c show a fourth embodiment of the valve where the seal ribbon and curved rocker of the first embodiment of the valve as shown in FIGS. 2a through 2c, has been replaced by a cylindrical tire placed around a disk magnet.

MODE OF CARRYING OUT INVENTION

Figure 1A:
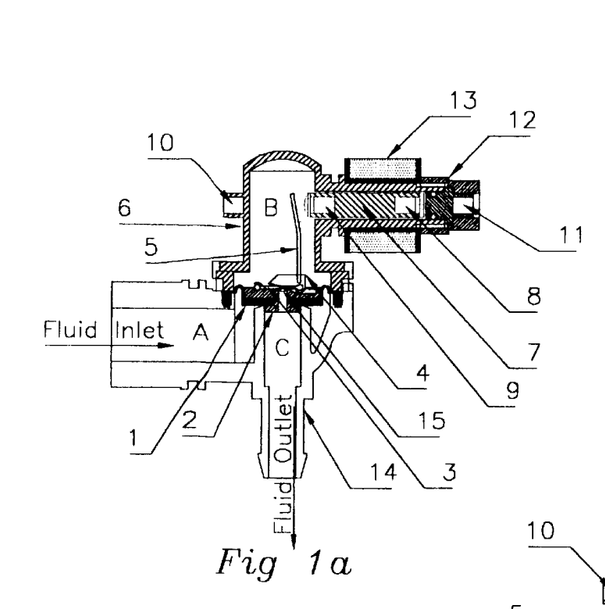
FIG. 1a is a cross-sectional view of a first embodiment of a valve according to the present invention, with the valve closed.
Figure 1B:
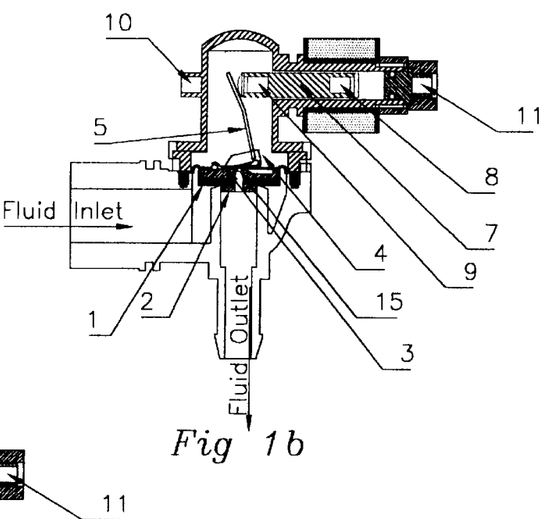
FIG. 1b is a cross-sectional view of the valve shown in FIG. 1a, with the valve shown at the point about to open.
Figure 1C:
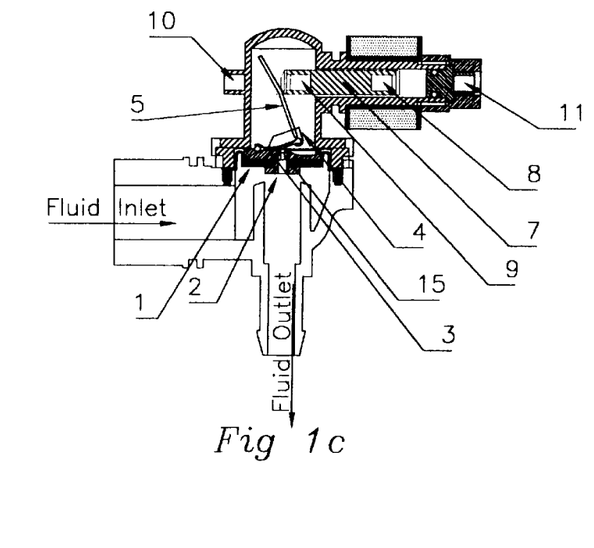
FIG. 1c a cross-sectional view of the valve shown in FIG. 1a, with the valve open.

FIGS. 1a through 1c show an electrically operated valve assembly where the use of a lever arm and rocker, to clear a seal ribbon from a bleed hole in a valve diaphragm to allow the valve to open, permits the use of a very small solenoid and permits the valve to remain open or closed after the supply of electric current is discontinued. With reference to FIG. 1a it can be seen that the valve body 14 and the sealing diaphragm 1 are the same as for the prior art solenoid operated valve shown in FIGS. 9a and 9b.

The diaphragm support 2 is similar to a conventional valve but differs in shape on its upper surface.

Figure 2A:
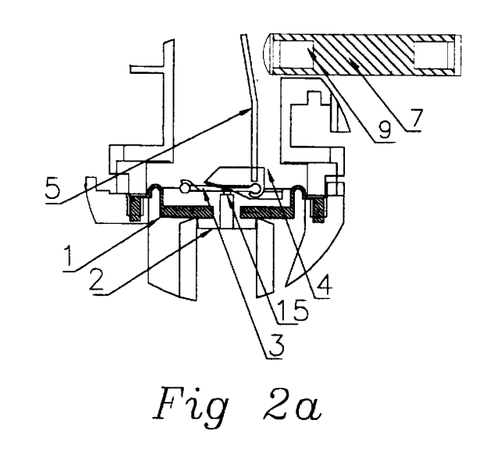
FIGS. 2a through 2c show enlarged views of the valve shown in FIGS. 1a through 1c, respectively showing the 'valve closed', 'at the point about to open' and 'with the valve open'.
Figure 2B:
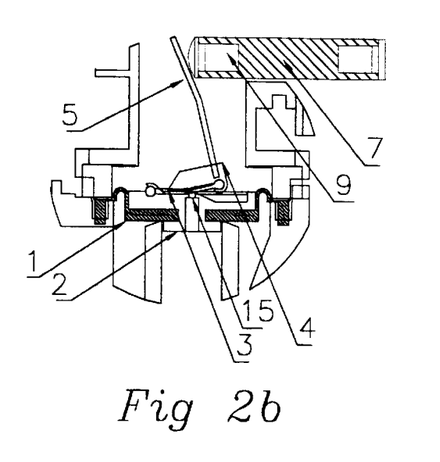
Figure 2C:
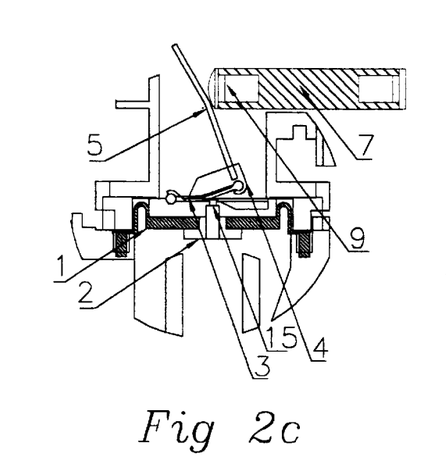
Figure 2D:
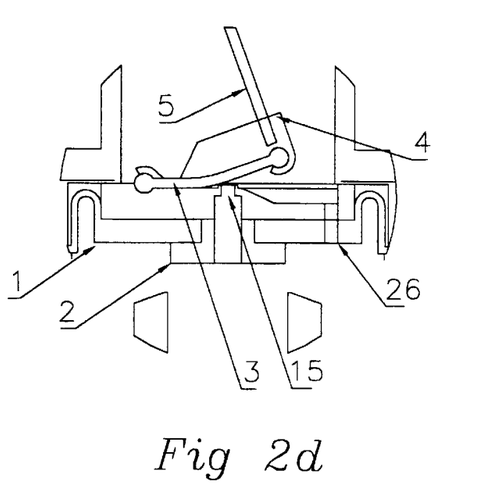
FIG. 2d shows an enlarged view of a portion of the valve components shown in FIGS. 1c and 2c.

The valve operation is the same as a conventional valve in that it has a communicating port 26, which is shown more clearly in FIG. 2d, and a bleed hole 15 to admit and release water under pressure from the upper chamber "B".

This invention does not have a metallic plunger to open and close the bleed hole as in the prior art valve, but instead uses a mechanical advantage and a rolling seal device to reduce the magnitude of the force which must be applied by an electric solenoid to open and close the valve.

The bleed hole is normally sealed with a seal ribbon 3 of elastomeric or other similar material. This is held in place by its attachment to the diaphragm support 2 and to a rocker device 4 which is attached to a lever 5.

Referring to FIGS. 1a, 1b, 1c, and to FIGS. 2a, 2b, 2c and 2d which are at a greater scale to show more detail the operation of the valve will be explained.

The electric solenoid 13 imparts a force on a magnetic material 8 which is normally a permanent magnet to force the plunger 7 forward to bear on the lever 5 which is also of a magnetically attractive material.

This force exerts a couple (or torque) on the rocker 4 to roll the seal ribbon 3 away from the bleed hole 15.

The mechanical advantage is very high as the moment which has to be applied to the seal ribbon to uncover the bleed hole is only the product of the water pressure and the area of the bleed hole multiplied by half of the bleed hole diameter. For a valve with a 1 mm bleed hole and a water pressure of 1 MPa this moment is in the order of 4×10−4 Newton metres.

For a valve where the lever arm 5 length is in the order of 20 mm, the force which must be exerted by the solenoid 13 on the plunger 7 is only in the order of 0.02 Newtons to open the valve. Such a force is readily applied by a solenoid operating at voltages as low as 1.5 Volts.

The plunger 7 is made of a permanent magnet material or alternatively of a non magnetic material with one or more permanent magnets mounted within it.

The plunger 7 shown is FIG. 1a is of a non magnetic material with two magnets 8 and 9 mounted within it. When the current flows through the solenoid the magnetic field generated exerts a force on the permanent magnet 8 to urge the plunger 7 forward against the lever 5. At this point the permanent magnet 9 is attracted to the lever 5, As the plunger moves forward and rolls the seal ribbon 3 away from the bleed hole 15 through the couple exerted on the rocker 4, the pressure in the chamber "B" is released permitting the diaphragm support 2 to rise and open the valve to permit the flow of fluid through the valve.

Once the plunger 7 is full forward and the seal ribbon is released from the bleed hole 15, the supply of electric current to the solenoid 13 may be discontinued and the valve will remain open as there is no restoring force on the ribbon 3 to close the valve.

If the direction of the magnetic field from the solenoid is reversed, by either reversing the electric current direction or having a second winding in the solenoid with the current flowing in the opposite direction to the first, then the plunger 7 will be attracted back to the solenoid. As the plunger 7 is attracted back to the solenoid the lever 5 is also attracted back as it is magnetically attracted to the plunger. This attractive force exerts a couple on the rocker 4 to lay the seal ribbon 3 back over the bleed hole 15 to close it off and thus close the valve.

In this embodiment of the valve, the lever 5 has a bend in it as shown in FIG. 1a, however, in other embodiments may be just a straight lever. With the bend in the lever 5, the rising of the diaphragm support 2 as the valve opens, exerts yet more displacement on the lever 5 and rotation of the rocker 4 to positively open the valve and prevent "dither" where the valve is only partially opened or opens very slowly as a device other than an electric solenoid is used to apply a force to the lever.

In a yet more detailed version of the valve a magnetic material or permanent magnets 10 and 11 are attached to the valve housing as shown in FIG. 1a. These magnetic materials serve the purpose of latching the valve open or closed when the current is cut off from the solenoid.

When the plunger 7 is fully forward and the current to the solenoid is cut off the magnetic attraction between permanent magnets 9 and 10 is greater than the attraction between magnets 8 and 11, and thus the plunger is retained in its forward position and the valve remains open and resistant to accidental closure due to vibration or inertia forces due to the physical movement of the valve.

When the plunger 7 is fully retracted and the current to the solenoid is cut off the magnetic attraction between permanent magnets 8 and 11 is greater than the attraction between magnets 9 and 10, and thus the plunger is retained in its retracted position and the valve remains closed and resistant to accidental opening due to vibration or inertia forces due to the physical movement of the valve.

Although the valve as described uses a magnetic attraction between the lever 5 and the plunger 7 to exert a couple on the rocker 4 to close the valve, this might also be achieved by having a physical connection between the plunger 7 and the lever 5.

Although the valve as described uses permanent magnets 10 and 11 to latch the plunger 7 forward or retracted, the latch might also be achieved by the attraction of the plunger to a magnetic material other than a permanent magnet.

Although the valve as described uses one or more permanent magnets in the plunger to react with the solenoid to provide a force to the plunger, this force might also be achieved by the solenoid reacting with a magnetically attractive material in the plunger which is not a permanent magnet. In this case the forward and retraction motion of the plunger may be achieved by having two solenoids separated and energised separately, so that one solenoid attracts the plunger forward and the other attracts it back.

Although the valve as described remains open or closed on the cessation of current flow through the solenoid, the valve may also be made to either open or close on the cessation of current flow through the solenoid, by the use of a spring to apply a permanent force to the plunger to either urge it forward or urge it retracted.

Although the valve as described has the communication passage 26 between chambers "A" and "B" passing through the diaphragm 1 and the diaphragm support 2 this passage may just as effectively pass through another part of the valve body.

The valve as described to this stage exerts a force on the lever by the interaction of an electric solenoid with the plunger.

When used as a level control valve this force may well be provided by other means.

Figure 3:
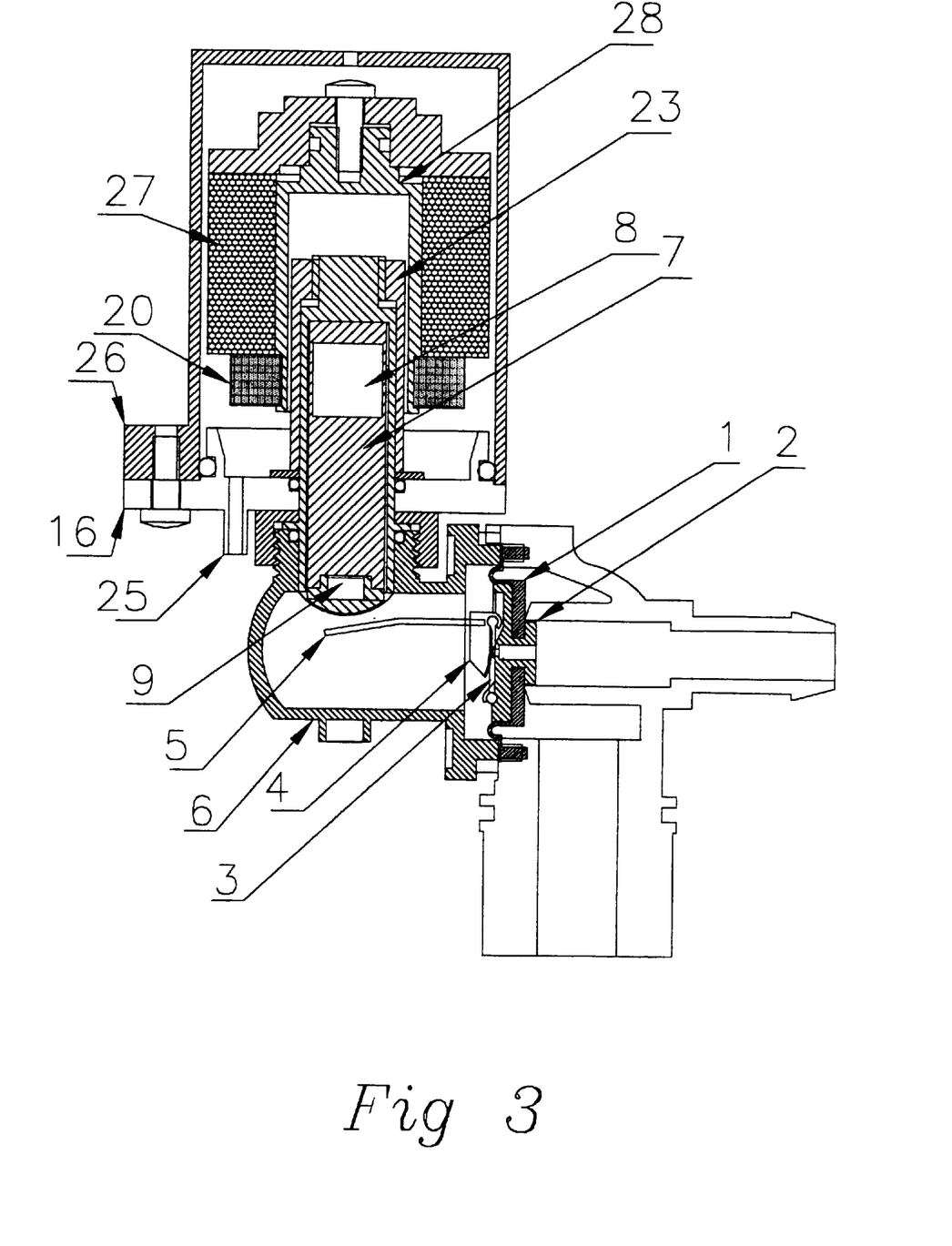
FIG. 3 shows a second embodiment of a valve according to the present invention, where the solenoid actuator shown in the first embodiment has been replaced by a float actuator.

FIG. 3 shows a second embodiment of the valve where a float is used to provide the force, rather than a solenoid actuator. With reference to FIG. 3 it can be seen that the valve components are the same as shown in FIG. 1a. In the case of this float operated valve, the solenoid has been replaced by a float housing 16 and 26 which contains a float 27 which is attached by a carrier 28 to a permanent magnet 20 which in this diagram is a ring magnet. The float housing communicates with the fluid whose level is to be maintained by means of a tube attached to the port 25 on the housing.

As the level of fluid in the housing rises so does the float and the magnetic attraction between the ring magnet 20 and the plunger magnet 8 causes the plunger to rise thus exerting an attractive force upwards on the lever 5 by means of the magnet 9 which in turn exerts a couple on the rocker 4 to place the seal ribbon 3 over the bleed hole and thus close the valve.

As the fluid level falls the reverse action occurs and the valve opens.

Because of the very low forces required by the lever to actuate the valve the float size required to operate the valve is very small.

As with the previous electrically operated version of the valve physical connection may be used in lieu of some of the magnetic connections to operate the valve. As with the previous electrically operated version, some of the permanent magnets may be substituted with magnetically attractive materials. As with the previous electrically operated version of the valve, the plunger may have only one magnet or may be comprised solely of magnetically attractive material.

Figure 4:
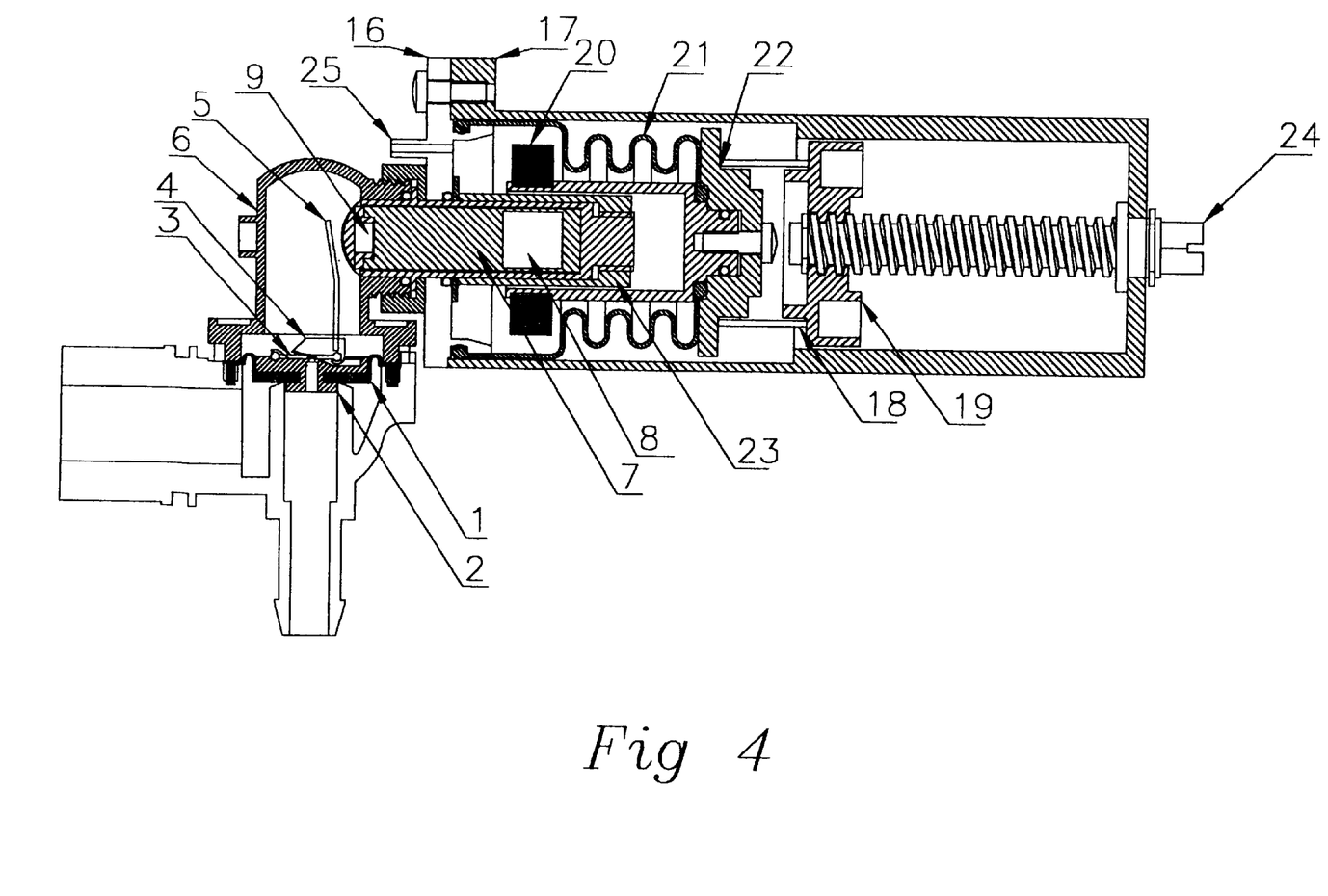
FIG. 4 shows a third embodiment of a valve according to the present invention, where the float actuator shown in the second embodiment has been replaced by a pressure sensing actuator.

FIG. 4 shows a third embodiment of the valve where a fluid pressure actuator is used to supply the force to open or close the valve. With reference to FIG. 4 it can be seen that when the fluid pressure is applied to the tube 25 it exerts a force on the bellows assembly 21 and 22, which retains a permanent magnet 20 to interact with the plunger 7 in the same manner as for the float operated valve of the second embodiment. The force on the bellows assembly is resisted by a spring 18 which is adjusted by its retainer 19 and an adjusting screw 24. As the pressure rises the motion of the bellows assembly is to compress the spring and thus the permanent magnet moves to urge the plunger retracted and so closes the valve.

FIG. 5 shows a fourth embodiment of the valve pilot stage where the rotational uncovering of the bleed hole is used to reduce the forces required to open the valve.

With reference to FIG. 5 it can be seen that the valve body and diaphragm 4 are the same as with the previously described embodiments. It can also be seen that the diaphragm support 2 is essentially the same as previously described, except that it does not have attachment points for the seal ribbon.

In the previously described valves the curved surface to reduce the forces required to open the bleed hole were achieved by the use of a seal ribbon and curved rocker. In this embodiment of the valve, the seal ribbon and curved rocker are combined into one component which is a hollow cylinder 28 wrapped around a permanent disk magnet 27. In physical terms the seal ribbon and rocker becomes a tire 28 fitted to the permanent tire magnet 27.

A force exerted on the tire magnet 27 causes the tire 28 to roll over the bleed hole 15. The mechanical advantage can still be very high. For example if the tire has a diameter of 20 mm, the force required to be exerted on the tire magnet to open the valve for a bleed hole diameter of 1 mm and a water pressure of 1 MPa is in the order of 0.04 Newtons.

Figure 5A:
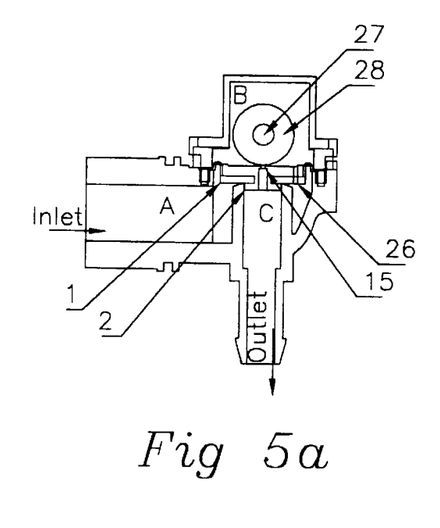
FIG. 5a shows an enlarged view of a portion of the valve components shown in FIG. 5b.
Figure 5B:
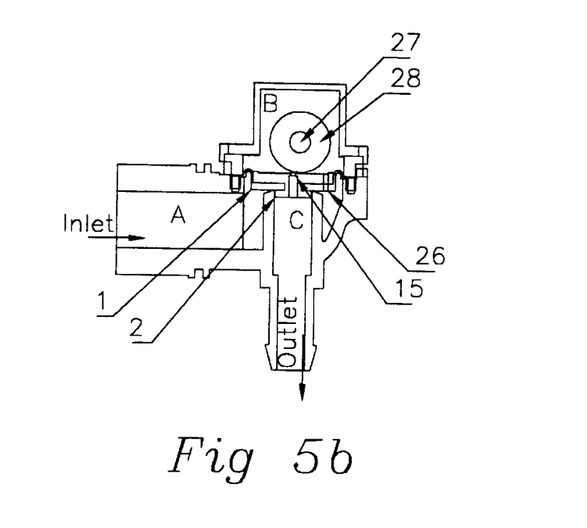
Figure 5C:
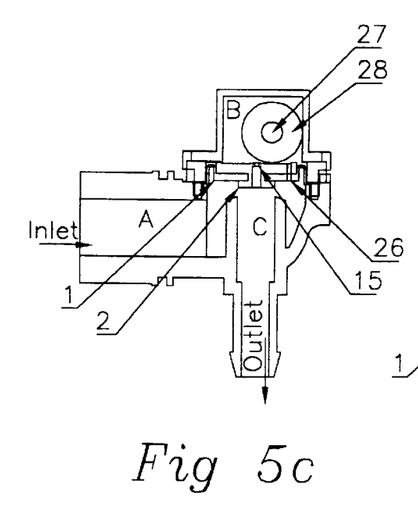
Figure 5D:
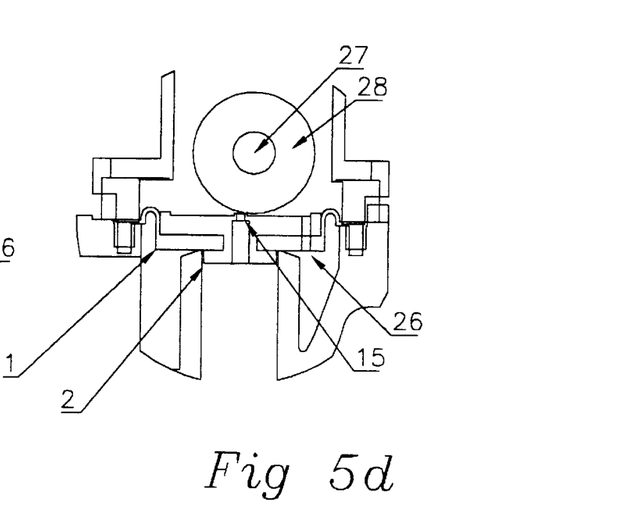

The operation of the valve is shown diagrammatically in FIGS. 5a through 5c. When the tire 28 is rolled over the bleed hole 15, the pressure in the upper chamber "B" rises and closes the valve. When the tire is rolled away from the bleed hole the pressure in "B" falls and allows the valve to close.

FIG. 6 shows the operation of this valve when an external device is used to exert a magnetic force on the permanent magnet 27.

Figure 6A:
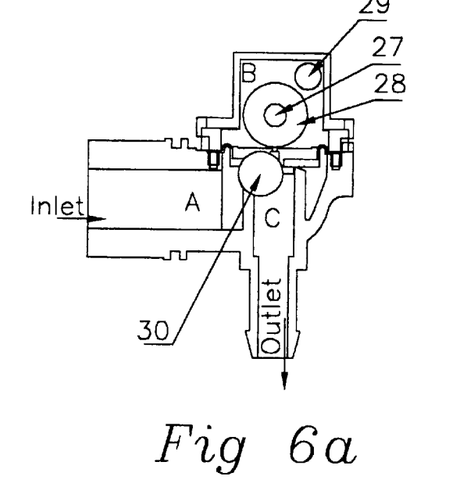
FIGS. 6a through 6d show the valve embodiment of FIGS. 5a through 5d with actuating magnets added to impart forces on the disk magnet and tire.
Figure 6B:
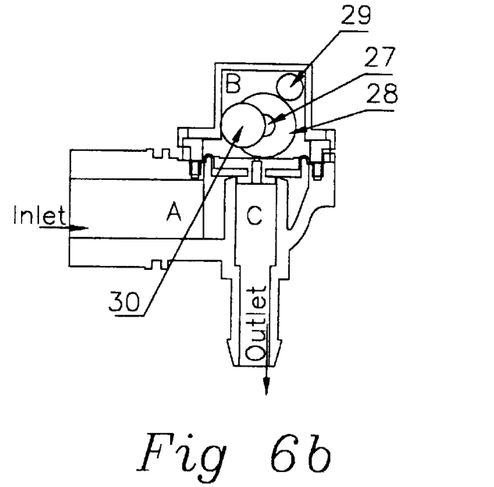
Figure 6C:
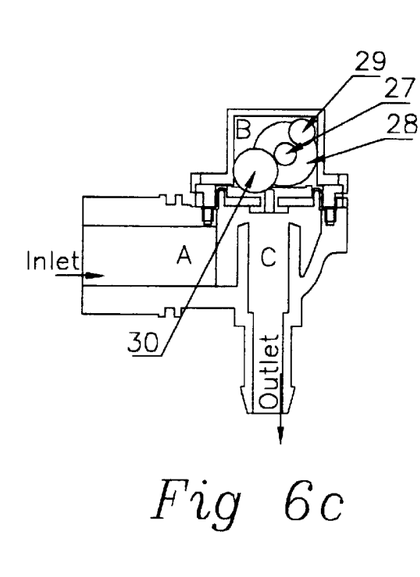
Figure 6D:
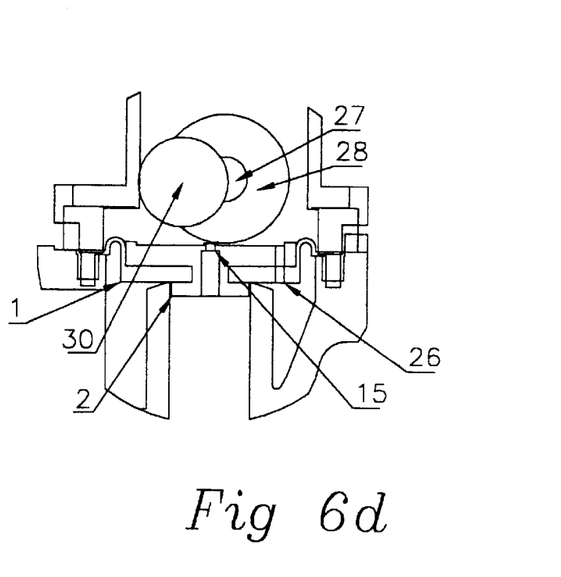

With reference to FIGS. 6a through 6c, a small permanent returning magnet 29 is used to urge the tire magnet 27 and tire 28 over the bleed hole 15. Another actuator magnet 30 is attached to the actuating device which may be a float or pressure operated actuating device as previously described.

In the closed position the actuating magnet 30 is sufficiently removed from the tire magnet 27 that the net repulsive force on the tire magnet by the returning magnet caused the tire to be forced over the bleed hole 15 to close the valve.

As the actuating magnet 30 rises, it exerts a repulsive force on the tire magnet to overcome the repulsive force of the returning magnet, and thus roll the tire off the bleed hole to allow the valve to open.

Although the operation is described as repulsion between the various magnets, an attractive mode may also be used with suitable placement of the magnets. Although all of the magnetic elements are described as permanent magnets magnetically attractive materials may be substituted for some of the magnets.

Although the valve is described as having a returning magnet 29 this may be omitted if the valve is orientated so that gravity forces are used to roll the tire over the bleed hole.

Figure 7A:
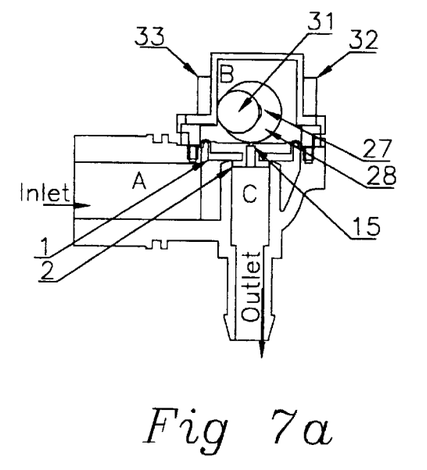
FIGS. 7a through 7d show the valve embodiment of FIGS. 5a through 5d where one or more electro magnets are used to impart forces on the disk magnet and tire.
Figure 7B:
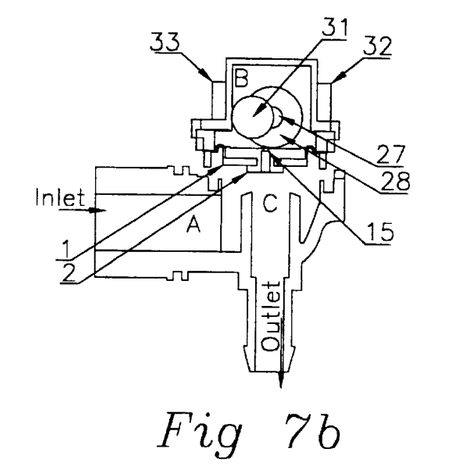
Figure 7C:
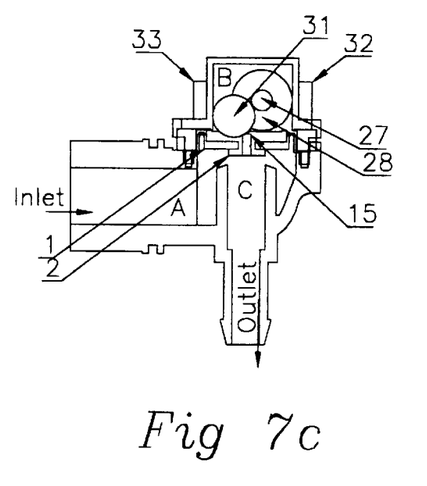
Figure 7D:
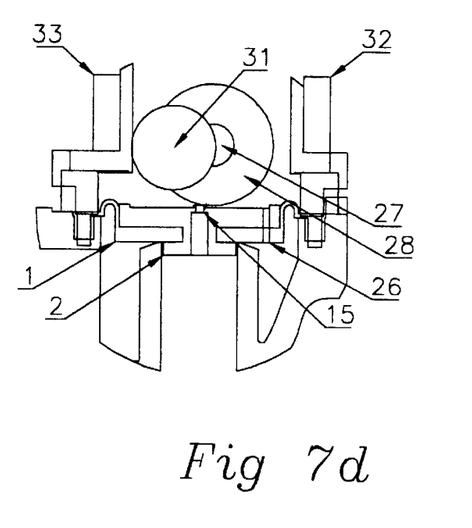

Another version of the valve is shown in FIGS. 7a through 7c. With reference to these diagrams the components are as previously described. The additional components are a small electromagnet 31 and keeper magnets 32 and 33.

In operation an electric current is passed through the electro magnet to repel the tire magnet 27 and tire 28 off the bleed hole 15, and thus permit the valve to open. When the tire is forced off the bleed hole, the tire magnet comes within the attractive force of the keeper magnet 32, which retains the tire magnet and latches the valve in the open state. The current to the electro magnet may now be turned off and the valve will remain open.

When an electric current is passed through the electro magnet in the opposite direction the tire magnet is attracted over the bleed hole to be retained by the keeper magnet 33 and close the valve. The current to the electro magnet may now be turned off and the valve will remain closed.

The keeper magnets need not necessarily be permanent magnets and may simply be of a magnetically attractive material.

Other arrangements of the electro magnet are possible so that more than one may be used to apply the forces to the tire magnet. With suitable locations of electromagnet it is possible to replace the permanent tire magnet with a magnetically attractive material.

Figure 8A:
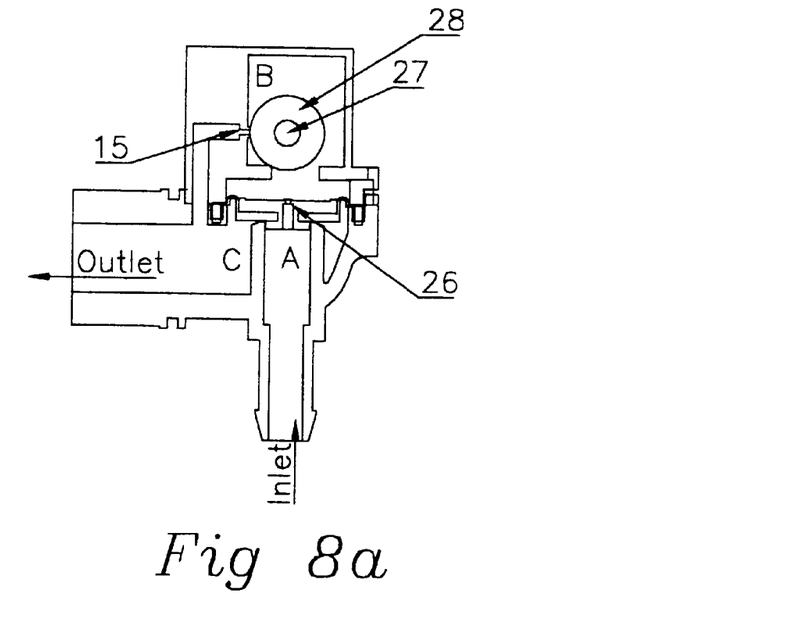
FIGS. 8a and 8b show a fifth embodiment of the valve with the arrangement of communication ports in the valve body altered to those shown in the previous embodiments.
Figure 8B:
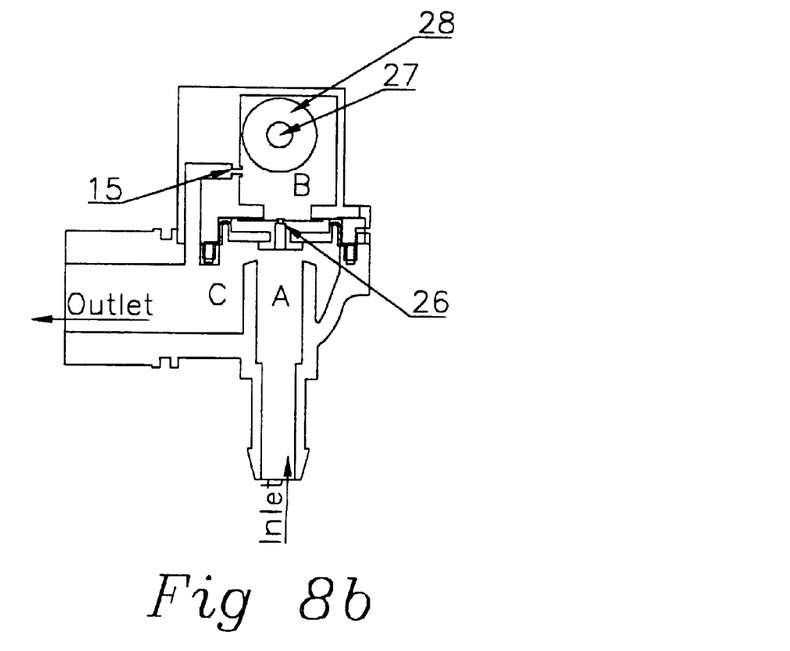

Another embodiment of this valve is described in FIGS. 8a and 8b, where the principles remain the same but the valve has a different physical layout. With reference to FIGS. 8a and 8b it can be seen that the communication port between chambers "A" and "B" is located within the diaphragm support. The bleed hole 15 between chambers "B" and "C" is within the valve body but the operating principles are still the same where the tire is rolled over the bleed hole to close the valve and away from the bleed hole to open the valve.

In the above described embodiments, the surface of the sealing element ie. the seal ribbon or tire which closes over the bleed hole is a convexly curved, to allow the sealing element to easily roll on and off the bleed hole. However, it should be understood that in other not shown embodiments the sealing element surface may be substantially flat or convexly curved with a large radius. In such embodiments the sealing element surface may be tilted over the bleed hole to allow for opening and closing of the valve.

I claim:

1. A valve that comprises a valve body defining a pressure chamber which is caused to open and close by changes in fluid pressure within that chamber and wherein the pressure within the chamber is controlled by the opening and closing of a chamber bleed orifice by a movable pilot valve element within the chamber, characterized in that said pilot valve element is shifted from sealing engagement with said orifice resulting from a force applied to said pilot valve element along a line of action which does not extend through said orifice and said pilot valve element comprises a seal device and a magnet or magnetisable body and wherein said force arises from a magnetic field established within said chamber.

2. A valve as claimed in claim 1, wherein said magnetic field is generated by a magnetic element external to said chamber.

3. A valve as claimed in claim 1, wherein said magnetic field is generated by a magnetic element internal of said chamber.

4. A valve as claimed in claim 1, wherein said magnetic field is generated by an electromagnet.

5. A valve as claimed in claim 2, wherein said magnetic element is connected to an actuator.

6. A valve as claimed in claim 5, wherein said actuator is a float actuator.

7. A valve as claimed in claim 5, wherein said actuator is a fluid pressure actuator.

8. A valve as claimed in 1, wherein said seal device has a convexly curved sealing surface.

9. A valve as claimed in 8, wherein said seal device is a seal ribbon.

10. A valve as claimed in claim 1, wherein said seal device is a tire mounted on a magnetic element.

* * * * *

UNITED STATES PATENT AND TRADEMARK OFFICE
CERTIFICATE OF CORRECTION

PATENT NO. : 5,954,311
DATED : September 21, 1999
INVENTOR(S) : Gary Keith Thorpe It is certified that error appears in the above-identified patent and that said Letters Patent is hereby corrected as shown below:

Col. 3, line 6 "5a" should be deleted and replaced with --5d--.

Signed and Sealed this

Twenty-ninth Day of February, 2000

Attest:

Q. TODD DICKINSON

Attesting Officer    Commissioner of Patents and Trademarks